United States Patent
Hebbagodi et al.

(10) Patent No.: US 6,651,242 B1
(45) Date of Patent: Nov. 18, 2003

(54) HIGH PERFORMANCE COMPUTING SYSTEM FOR DISTRIBUTED APPLICATIONS OVER A COMPUTER

(75) Inventors: Praveen Hebbagodi, Bangalore (IN); Sunil Arvindam, Bangalore (IN); Sameer Shantilal Pokarna, Bangalore (IN)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/460,617

(22) Filed: Dec. 14, 1999

(51) Int. Cl.$^7$ .............................................. G06F 9/45
(52) U.S. Cl. ......................... 717/127; 714/2; 714/798; 709/103; 709/106; 709/318
(58) Field of Search .............................. 717/127; 714/2, 714/798; 709/318, 319, 104, 106, 103

(56) References Cited

U.S. PATENT DOCUMENTS

| | | | | |
|---|---|---|---|---|
| 4,321,666 A | * | 3/1982 | Tasar et al. | 714/10 |
| 4,356,546 A | * | 10/1982 | Whiteside et al. | 714/10 |
| 5,210,871 A | * | 5/1993 | Lala et al. | 710/116 |
| 5,513,354 A | * | 4/1996 | Dwork et al. | 709/106 |
| 5,745,758 A | * | 4/1998 | Shaw et al. | 709/102 |
| 5,982,780 A | * | 11/1999 | Bohm et al. | 370/450 |
| 6,018,727 A | * | 1/2000 | Thaler | 706/16 |
| 6,249,755 B1 | * | 6/2001 | Yemini et al. | 702/183 |
| 6,442,589 B1 | * | 8/2002 | Takahashi et al. | 709/203 |
| 6,470,385 B1 | * | 10/2002 | Nakashima et al. | 709/224 |

OTHER PUBLICATIONS

Barborak et al., The Consensus Problem in Fault Tolerant Computing, Jun. 1993, ACM, p. 171–230.*
Das et al., A Dynamic Load Balancing Strategy . . . , 1997, ACM, p. 333–347.*
Guerraoui, Rachid, et al., " The Generic Consensus Service "extended and revised version of" Consensus Service: A Modular Approach for Building Agreement Protocols in Distributed Systems", in the proceedings of the 26$^{th}$ IEEE International Symposium on Fault–Tolerant Computing (FTCS–26), Sendai (Japan), Jun. 1996, pp. 168–177.

* cited by examiner

Primary Examiner—John Chavis
(74) Attorney, Agent, or Firm—Haynes and Boone, LLP

(57) ABSTRACT

A system that includes one or more priority failure detectors may be included that detect node or process failures in the distributed computer network. The system has a fault-tolerant, client-server architecture where a client process presents a particular consensus problem to one or more server processes to solve such a consensus based problem. The system assigns priority levels to processes involved in a consensus session and controls the frequencies of their heartbeat status messages based on their respective priority levels. By controlling the frequencies, the reliability of the network is enhanced and the overall message load on the even bus is reduced to a minimum number. The system also discloses a name service that assigns unique logical identities to all processes in a consensus session. Further, by tagging all involved processes appropriately, multiple consensus based problems can be dealt with on a set of consensus server processes simultaneously.

51 Claims, 2 Drawing Sheets

HIGH PERFORMANCE COMPUTING SYSTEM FOR DISTRIBUTED APPLICATIONS OVER A COMPUTER

BACKGROUND OF THE INVENTION

The present invention relates generally to computer software, and more particularly, to a system and method for a scalable, high performance computing infrastructure for distributed software applications over a computer network.

With the rapid expansion of both local and wide area computer networks, it is no longer an unreachable goal to link geographically distributed network sites (or nodes) together. This has led to a demand for the development of distributed software applications that take advantage of the revolutionized computing connectivity. A distributed computer system will have various software applications located on different local nodes, but are concerted to act together. Writing reliable distributed software applications for a distributed computer system has been a difficult and error-prone activity due to a variety of reasons such as asynchrony of different nodes in the distributed network, individual node or network failures, network partitioning, or uncontrollable network latencies, etc. Although each local distributed software application may be functional at the local node, maintaining a consistent global state has been enormously difficult. In the face of this complexity, programmers are forced to create centralized solutions that are rarely reusable, and have poor fault tolerance. Therefore, actual implementations of a fault tolerant, high performance distributed computer system hardly exist in the industry.

The design as well as the verification of a fault-tolerant distributed system is a highly non-trivial task and rests on a few fundamental paradigms. One key paradigm among these is consensus. Consensus can be viewed as a general form of agreement in the distributed computer system, wherein a group of processes reach a common decision based on their initial inputs, despite failures of some of the processes in the group. Atomic Broadcast, another important paradigm in the distributed systems, has been shown to be equivalent to consensus. Further, many frequently occurring problems such as Atomic Commitment, Group Membership and View Synchrony can be reduced to an appropriate consensus based problem. Besides the consensus issue, reliability of such a distributed computer system is also a key concern. Various applications for a distributed computer system that require a high reliability include air traffic control systems, automation software for industries, financial and brokerage software and many more.

A method and system is thus needed for dealing with all consensus based problems in a high performance distributed computer system that is tolerant to node or network failures and latencies.

SUMMARY OF THE INVENTION

A system and method is provided for a high performance distributed computer network system that is tolerant to node or network failures and latencies. The distributed computer system is a dynamic clustering computing system where distributed objects can join and leave a cluster as an application demands. It effectively deals with all consensus based problems in the distributed computer network having various consensus based application protocols.

In some embodiments, the system is a common platform supporting heterogeneous operating systems and provides structuring mechanisms to present a global state of a distributed application using an "objects as groups" paradigm.

In some embodiments, structuring abstraction elements such as transactional messaging and group communications are available in a distributed computer network. These embodiments thus provide a software-based approach to object clustering where distributed objects are the units for clustering together and an object group abstraction is the principal structuring element.

Some embodiments include an event bus for transporting all communication messages among objects or processes in the distributed computer system. These embodiments also have a fault-tolerant, client-server architecture where a client process presents a particular consensus based problem to server processes to start a consensus service in order to solve such a consensus based problem. In addition, one or more priority failure detectors may be included that detect process failures in the distributed computer network. The present invention assigns priority levels to processes involved in a consensus session and controls the frequencies of their heartbeat status messages based on their respective priority levels. By controlling the frequencies, the reliability of the network is enhanced because processes having high priority can have a high rate of message communication. On the other hand, the overall message load on the event bus can be controlled and reduced to a minimum number due to a reduction of status messages for the low priority processes.

Some embodiments also disclose a Name Service that assigns unique logical identities to all processes in a consensus service. In one embodiment of the present system, during the initiation of a consensus service, all participating consensus server processes are required to register with the Name Service, and logical identities will be assigned only after all participating consensus server processes complete the registration process.

In another embodiment, the present invention handles multiple consensus based problems concurrently. By tagging all involved processes appropriately, multiple consensus based problems can be dealt with on a set of consensus server processes simultaneously.

The present invention thus improves the performance and enhances the reliability of such a distributed computer network.

DESCRIPTION OF THE PREFERRED EMBODIMENTS

In a distributed computer system, a set of objects or processes that are scattered across a distributed computer network can hardly cooperate to agree upon a common value that is to be used for all of them. Once a distributed consensus based problem is dealt with, practical agreement problems such as Atomic Commitment, Atomic Broadcast, and View-Synchronous Group Membership can be solved too. Since these problems are difficult to handle in the distributed computer system, solutions to them provide powerful structuring mechanisms through which multiple distributed applications can maintain a consistent global state even in the presence of node and link failures. A common platform is thus provided for supporting heterogeneous operating systems and for providing structuring mechanisms to present a global state of a distributed application using an "objects as groups" paradigm. For the sake of explaining the present invention and as it is known in the art, the term "process" and the term "object" are used interchangeably. Also, in the following description, the term "message" and the term "event" are used interchangeably.

Figure 1:
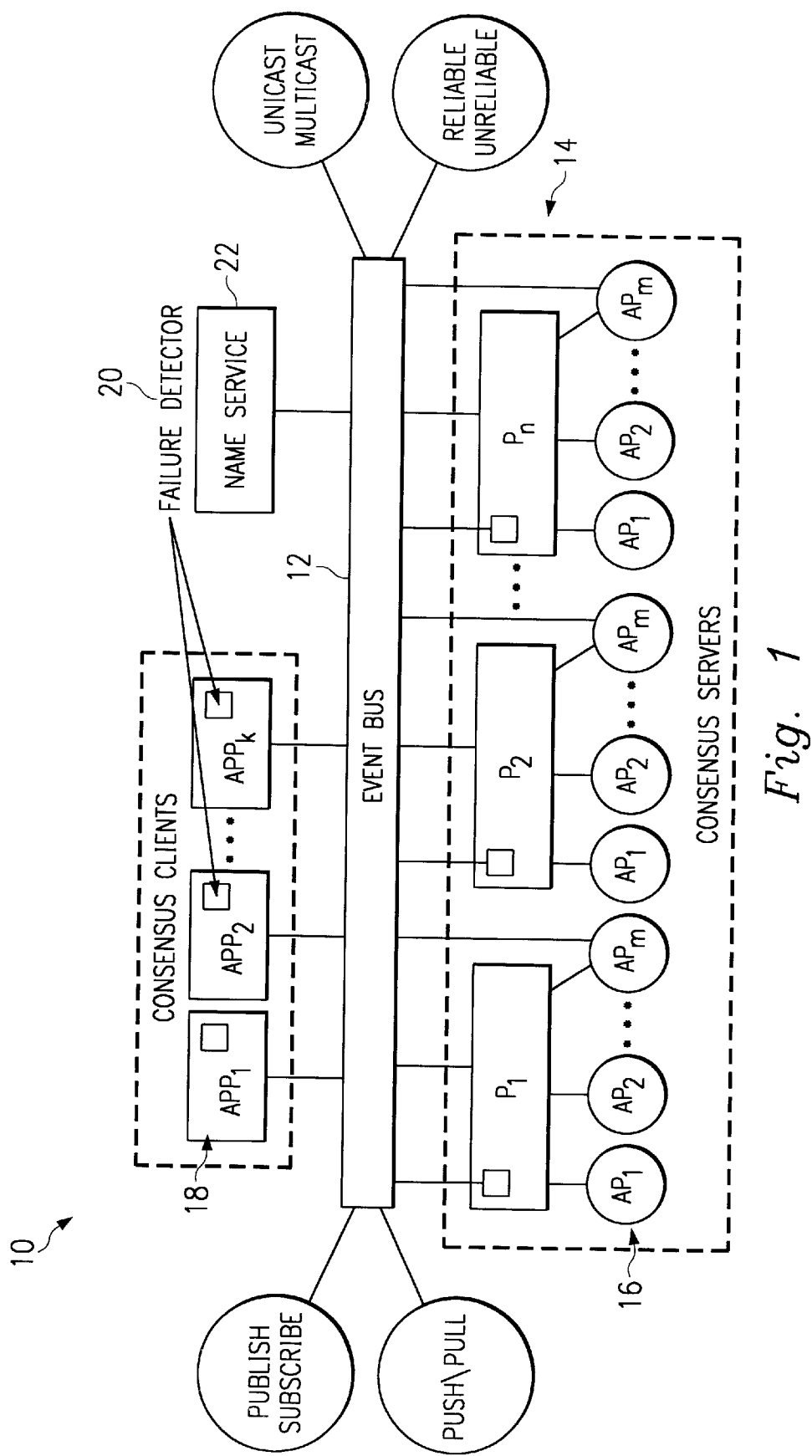
FIG. 1 illustrates a schematic of one embodiment of the present invention for a high performance distributed computer system.

FIG. 1 is a schematic of a high performance distributed computer network system (the "System") 10 for handling distributed applications according to one embodiment of the present invention. The System 10 is implemented using a modular architecture. An Event Bus 12 provides basic message transportation services to all components in the System 10. Connecting and communicating to the Event Bus 12 are a pool of consensus servers labeled $P_1$–$P_n$ 14. Their major function is to solve specific consensus based problems 16 such as $ap_1$–$ap_m$ for application objects 18, which are also labeled as $app_1$–$app_k$. Hence, the application objects 18 and the consensus servers 14 bear a client-server relationship respectively. Both the clients and the servers have access to a series of priority failure detectors 20. A Name Service 22 provides unique logical identification numbers or IDs to each application object 18. The Name Service is a generic service that assigns logical IDs to all processes in a Consensus Service if needed.

The Event Bus 12 is the back bone, or the main message communication channel of the System 10, on which applications can exchange messages. A message can be any arbitrary object. All the messages can be easily filtered, logged, or correlated if it is necessary. The Event Bus 12 supports both unreliable messaging process such as UDP or IP multicast messaging and reliable messaging process such as TCP multicast messaging. Protocols for reliable multicast messaging are based on gossip-style anti-entropy type that are scalable and reliable for each event. That is, messages are guaranteed to be delivered if both sender and receiver objects are correctly identified. It is known that gossip-style protocol sessions are probabilistic in nature, i.e., a process chooses its partner processes with which it communicates randomly. In one embodiment of the present invention, the partner processes can be chosen a priori at when a process joins a consensus group. With the above described structure, a high reliability is achieved even in wide area networks.

The Event Bus 12 is also composed of a stack of protocol object layers, each of the layers providing and defining a different Quality-of-Service (QOS). Although no guarantees are provided regarding message transmission delays, the Event Bus 12 offers different QOS with respect to reliability of the transmission. For example, some processes can choose UDP protocol to send their messages if there is not much concern about the reliability of the message transmission, while some other processes having a serious concern about network communication reliability can use TCP protocol for a far better reliability performance. In the case of a reliable QOS, the Event Bus 12 can be classified as "eventually reliable," which means that a message sent by a process to another process is eventually delivered if both of them are "live" processes. One way of achieving this would be by retransmission of messages in the case of a unicast messaging or by "gossip" in the case of a multicast messaging.

Hence, by choosing an appropriate QOS, application processes can implement anything from comparatively unreliable IP multicast and UDP unicast messaging to TCP or more reliable multicast messaging. Since such processes are executed through sending, receiving messages, or performing a local computation, applications need to couple transport reliability with typical messaging semantics such as push, pull, remote method call or asynchronous receive (callbacks) to implement their required messaging functionality. Thus it is important that receiver objects can subscribe for messages based on their application defined types or their contents. For application defined types, such as Java types, it means that an application can define its own type of message and subscribe for that type of message. If an incoming message is of the application defined type, then it will be delivered to the application. On the other hand, for a content based subscription, the content of a message is to be examined to find whether it will be delivered to a corresponding receiver. For instance, an application can subscribe to the messages from a Stock Exchange if the company name is Novell and the stock value is more than $50. Then a message only gets delivered if the content in the message has Novell and the stock value is over $50.

As shown in FIG. 1, a series of priority failure detectors 20 monitor application processes of the System 10. Each of the priority failure detectors 20 maintains a list of application processes that are currently suspected to be inoperative and a list of application processes that are running appropriately.

In one embodiment of the present invention, the failure detection is implemented through a message communication mechanism called "heartbeat" messaging. For instance, an application object A periodically sends an "I am alive" status message to all other application objects. If an application object B does not receive such a message from A within a predetermined timeout period, then B's priority failure detector starts to suspect whether A is inoperative. The failure detector thus put A on its suspect list. If later B receives a message from A that indicates A's continuous and uninterrupted operation, B recognizes that the previous suspicion may not be warranted, and removes A from the suspect list. As a consequence, B also extends the predetermined timeout period for A since this experience has instructed B that the previous value for the timeout period may not work the best for indicating the status of A.

These heartbeat status messages are important to the System 10, however a universal frequency of these heartbeat status messages can overload the Event Bus 12. Thus, a method to reduce an overall number of these messages is needed. First, the System 10 prioritizes all participating processes in a consensus session according to their importance. Since processes of lower priorities can afford to send the heartbeat status messages in a less frequent manner, the System 10 adjusts the frequency accordingly so as to reduce the total number of messages on the Event Bus 12. On the other hand, some processes are of high priority to the consensus session, thus it is important to know the status of these processes at any given time. Therefore, the frequency of the heartbeat status messages sent by a high priority process can be adjusted to a higher rate comparing to low priority processes. Consequently, the reliability of the System 10 is enhanced by raising such frequencies. On intranets and tightly-coupled clusters, the priority failure detectors 20 come close to achieving eventually perfect properties, since a failure suspicion indicates with high probability that a suspected object, or the link to it, has indeed failed. Moreover, the priority levels can be set or changed dynamically by the System 10. Further, in another embodiment of the present invention, a regular message, in lieu of a particularly formatted heartbeat status message, can be used for the purpose of informing the priority failure detectors 20 about the "liveliness" of other processes. By doing so, the number of heartbeat status messages are further reduced.

In detecting node or network failures, the System 10 implements a fail-stop model, i.e., once a process fails, it never recovers. As an alternative, a more general crash-recovery model can be implemented.

With the Event Bus 12 and the priority failure detectors 20 in place, a Distributed Consensus Service (DCS) is provided by the System 10 to directly deal with consensus based problems and thus helps to build an efficient distributed computer network. The DCS is a generic agreement service that can be customized to solve specific instances of consensus based problems by defining various filter functions.

From the perspective of a system architecture, the DCS may include the consensus servers 14, the consensus clients 18, the priority failure detectors 20 and other necessary application processes. In one embodiment of the present invention, when an initiator, which is one of the consensus clients 18, multicasts a message to a set of other consensus clients 18, it thus starts a consensus based problem. The consensus client uses the consensus servers 14 to solve the consensus based problem in a consensus session. However, the client and server roles can also be overlapped, for example, the role of the server process can be played by a subset or all of the client processes. Interactions among the initiator, the consensus clients 18, and the consensus servers 14 take place over reliable multicast messaging. In order to enhance the reliability of the System 10, the consensus servers 14 usually retransmit messages periodically to avoid unexpected communication blockages.

Figure 2:
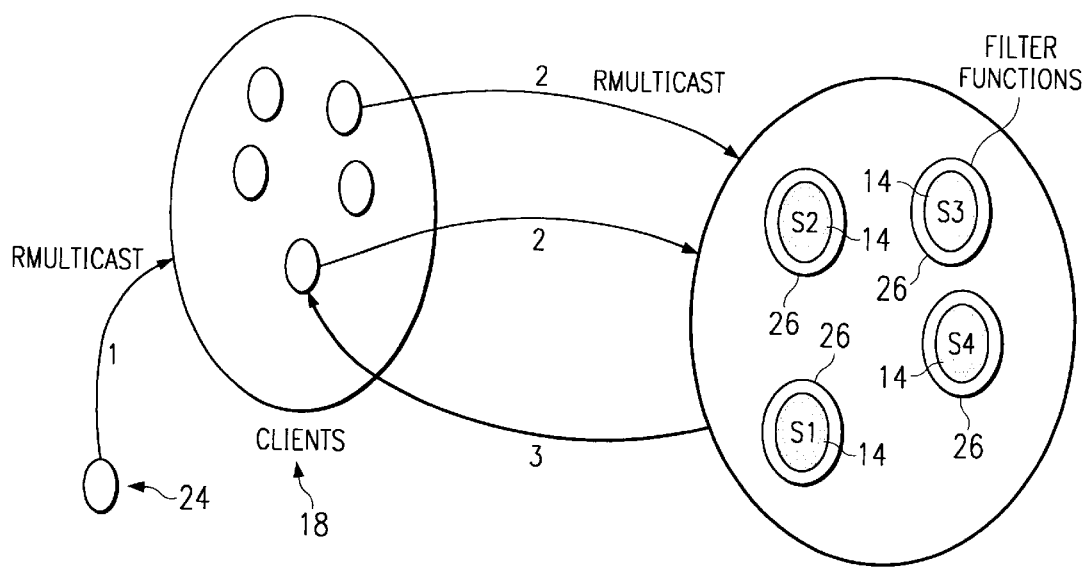
FIG. 2 illustrates an operation of a Distributed Consensus Service of the system of FIG. 1.

FIG. 2 illustrates the operation of the DCS. An initiator 24 multicasts a message, which contains segments of parameters such as consensus ID, problem specific information, and selected processes for solving the consensus problem, to a selected group of consensus clients 18. Upon receiving the initiation message, the consensus clients 18 compute certain data which contain problem specific information, and then multicast the message further to the consensus servers 14 and wait for the decision from these servers 14. There are consensus filters 26 attached to each server 14, which tailor the DCS to specific consensus problems. The filters 26 transform the message received by a consensus server 14 into a consensus initial value. Usually, the consensus filter 26 is defined by two parameters, a predicate function CallInitValue and a function InitValue. CallInitValue defines the condition under which InitValue can be called and a consensus session can be initiated.

The consensus servers 14 are required to register with the Name Service 22 every time when the DCS starts up. The consensus servers 14 are then blocked at a barrier synchronization point until all servers 14 have registered with the Name Service 22. This helps to implement the fail-stop model where a required number of servers need to be started simultaneously. Then, the Name Service 22, which is incorporated in the System 10 as a module, assigns unique logical IDs to each consensus server 14, and thereafter, the consensus servers 14 begin their execution. Once it starts, no new process is allowed to join in.

The consensus clients 18 can also get IDs from the Name Service 22. Each involved consensus client sends it's request to the Name Service 22, which returns a unique identity to every consensus client 18. After receiving all the requests, the Naming Service returns a consolidated list of all the members of the group to all the consensus clients 18.

Figure 3:
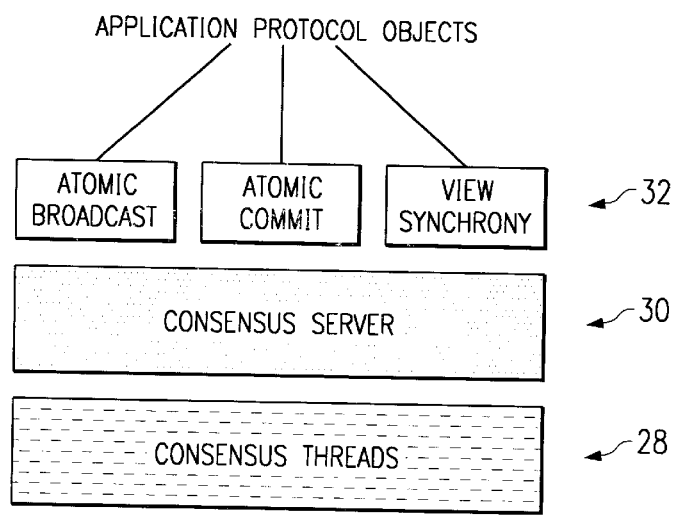
FIG. 3 illustrates a design of a consensus server process with a layering representation.

In solving a consensus based problem, usually a unanimous and irrevocable decision must be made on a value or an object that is asked for or related to that proposed by the initiator 24. The design of a consensus server 14 can be viewed as a three-layer architecture as shown in FIG. 3. The bottom layer 28 is a pool of consensus threads handling different consensus sessions of various consensus based problems. These are a pool of threads that execute generic consensus protocols. The middle layer 30 manages all the consensus threads, communication among various consensus servers 14, and interactions between the Event Bus 12 and other components. The top layer 32 comprises of various specific application processes with different protocols such as atomic broadcast, atomic commit, and view synchrony, etc. The DCS is customized by appropriately defining consensus filters in a run time fashion in order to accommodate specific application processes and to solve consensus based problems.

As shown in FIG. 1, in a particular distributed application using a consensus based protocol, the consensus servers communicate directly with their consensus clients through the Event Bus 12. This is depicted in FIG. 1 where the server components of the application protocols ($ap_1$, $ap_2$ ... ,$ap_k$) communicate directly with the client components (app1, ,app2, ... appm). The consensus filters 26 for a particular application protocol receives an expected number of proposals from various clients in its group and yields its proposal to their consensus servers 14. The consensus servers 14 decide upon one value or an object and reliably deliver it back to the consensus clients 18. Hence, the DCS acts like a "black box" and is completely detached from the consensus clients 18 as well as their specific application protocols. This enables the DCS to work with various consensus based problems with different application protocols. This separation of a generic DCS from various application protocols makes the System 10 modular and flexible.

In one embodiment of the present invention, the DCS has another component that acts like a mediator among the consensus threads, the priority failure detector, the Name Service, the Event Bus 12, and other application processes. Moreover, in order deal with multiple consensus based problems, each consensus session has a unique identification number which is tagged with all the messages that belong to the session. This assists the System 10 to handle and deliver the messages to corresponding consensus threads without confusion.

The DCS uses an algorithm for solving the consensus based problems. In one embodiment of the present invention, the selected algorithm uses a special type of priority failure detectors 20 which requires the number of faulty processes is less than $[(n+1)/2]$ wherein n is the total number of processes involved. The algorithm uses a rotating coordinator paradigm and proceeds in asynchronous rounds of consensus services. During round R, a coordinator is the process number C, where C=(R mod n)+1. Once a coordinator is first selected, it tries to obtain a unanimous and consistent decision on a value or an object. All messages from the consensus clients 18 are unicasted to the "current" coordinator, but the messages from the coordinator will be multicasted to all other consensus servers 14 involved in the DCS.

Each round of the consensus service session is sub divided into four asynchronous phases. In phase 1, every process sends its current estimate of the decision value to the current coordinator. The message is time-stamped with the round number. Subsequently in phase 2, the coordinator gathers N numbers of such estimates, where N equals to (n+1)/2. Then, the coordinator selects one estimate with the largest time stamp, and multicasts it to all the processes as the new estimate. In phase 3, a particular process has two possibilities in its operation. One, it receives the multicasted estimate from the coordinator and sends an acknowledgment to the coordinator to indicate that it adopts the estimate as its own. Or, the process, upon consulting with its priority failure detector, suspects that the coordinator has been dysfunctional, and sends a message to the coordinator indicating that it desires not to acknowledge the estimate. In phase 4, the coordinator waits for (n+1)/2 replies, whether they are acknowledgment or non-acknowledgment messages. If all replies are acknowledgment messages, the coordinator knows that a majority of the processes have accepted the estimate, then, it multicasts a request asking every process to adopt that estimate.

Since all communications rely on messaging through the Even Bus 12, it is imperative for the performance of the System to reduce messaging transfer. In one embodiment of the present invention, in order to further reduce the message traveled on the Event Bus 12, a predetermined set of consensus clients 18 communicate only with a designated consensus server 14.

In yet another embodiment of the present invention, in order to enhance the system reliability, a predetermined set of consensus clients 18 not only communicates to a primary consensus server 14, but also communicate to a secondary consensus server 14. Every message sent to a primary server is replicated on a secondary server. If the primary server fails for any reason, the consensus clients 18 automatically fall over to the secondary consensus server 14 after a few seconds. Since the entire state on the secondary consensus server 14 is an exact replica of the state on the primary consensus server 14, the consensus clients 18 restart exactly where they were left off by the primary consensus server 14.

In another embodiment of the present invention, the System 10 locks on two or more distributed objects using consensus based protocols in a distributed computer network. In a distributed computer system, there is no centralized lock manager and hence there will be no single point of failure. The objects who request for the lock will broadcast their requests to all resource objects of their interest. These requests are queued and processed sequentially. For each request, these resource objects undergo a consensus session and decide on an object to whom all of them will grant the lock. In one embodiment of the present invention, the lock requests are atomic-broadcasted to all the resource objects. By doing so, a new resource object can join the System 10 any time without bringing down the entire System 10. Since it uses consensus based protocols, it is immune from failures of the resource objects. Replicated objects can also be locked along with distributed objects by implementing certain consistency conditions.

The above disclosure provides many different embodiments, or examples, for implementing different features of the invention. Techniques and requirements that are only specific to certain embodiments may be imported into other embodiments. Also, specific examples of components, and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for solving consensus based problems in a distributed computer network, the distributed computer network having at least one distributed consensus client process proposing a consensus based problem, and at least one distributed consensus server process for solving the consensus based problem, the method comprising the steps of:
   transporting communication messages among distributed processes through an event bus;
   using at least one priority failure detector to detect failed processes based on heartbeat status messages, wherein using the priority failure detector includes:
      assigning all processes in the consensus session with a set of Predetermined priority levels;
      adjusting a frequency of a periodic heartbeat status message sent by each prioritized process based on its assigned Priority level, wherein an amount of traffic on the event bus may be minimized by adjusting the frequency; and
      detecting a failure of the prioritized process based on the frequency controlled heartbeat status message; and
   achieving a universal consensus result by providing a distributed consensus service through an asynchronous consensus session with the assistance of the event bus and the priority failure detector,
   wherein any failure in a single process in the distributed computer network does not affect any other process, thus providing a fault tolerant and reliable network mechanism.

2. The method of claim 1 wherein the step of achieving further includes a step of providing a name service for assigning a unique logical identity to each process.

3. The method of claim 2 further includes the steps of:
   registering all related distributed consensus server processes with the name service upon initiation of the distributed consensus service; and
   assigning the unique logical identity to each distributed consensus server process only after all the distributed consensus server processes have completed the registration.

4. The method of claim 1 wherein the step of adjusting further includes the step of assigning a high frequency for a heartbeat status message for a process of a high priority level so that reliability of the distributed computer network is enhanced.

5. The method of claim 1 wherein the step of adjusting further includes the step of assigning a low frequency for a heartbeat status message for a process of a low priority level so that the overall message communication on the event bus can be minimized.

6. The method of claim 1 wherein the event bus offers different Quality-of-Services for different consensus based protocols based on a needed reliability level of the communication.

7. The method of claim 1 wherein the step of achieving a universal consensus result further includes the steps of:
   initiating a consensus problem from a client process by sending a proposed value to a group of related processes with the assistance of at least one agreement protocol;
   filtering the consensus problem in order to customize the consensus service in a run time fashion;
   solving the consensus problem by all consensus server processes;
   passing the consensus result solved to the agreement protocol; and
   distributing the consensus result to all related processes of the agreement protocol, wherein the consensus server processes are detached from any client process through the step of filtering.

8. The method of claim 7 wherein a predetermined set of client processes communicate only with a designated consensus server process.

9. The method of claim 7 wherein a predetermined set of client processes communicate with a first designated consensus server process and a second designated consensus server process, wherein the second designated consensus server process is a backup server process for the first designated consensus server process.

10. The method of claim 7 further includes a consensus coordinator that manages all related processes for solving the consensus problems.

11. The method of claim 7 wherein the consensus coordinator manages multiple consensus problems concurrently.

12. A method for locking two or more distributed objects using consensus based protocols in a distributed computer network, the method comprising the steps of:

broadcasting a request to at least one resource object for a lock on one or more proposed objects by an initiating distributed object using a consensus based protocol; and deciding on the proposed objects through a consensus service session for the resource objects to grant the lock to the one or more proposed objects in a predetermined order, wherein any failure in a single resource object in the distributed computer network does not affect the other objects, thus providing a fault tolerant and reliable mechanism.

13. The method of claim 12 wherein the step of deciding further includes the step of customizing the consensus service for different agreement protocol in a runtime fashion using appropriate filtering mechanisms.

14. The method of claim 12 wherein all messages necessary for the consensus service are transported on an event bus.

15. The method of claim 12 further comprising at least one distributed priority failure detector for detecting any related process failure, the related process being prioritized based on the importance of the process to the consensus session.

16. A method for detecting process failures in a distributed computer network, the method comprising the steps of:

requiring a heartbeat status message to be sent periodically from a first process to a second process;

assigning a priority level to the first process in the distributed computer network;

controlling the frequency of the heartbeat status message of the first process according to its priority level; and detecting any process failure of the first process by the second process based on the reception of the heartbeat status message.

17. The method of claim 16 wherein the priority status can be set or changed dynamically.

18. The method of claim 16 further includes a step of adjusting a timeout value in the second process for receiving the heartbeat message.

19. The method of claim 16 wherein the step of controlling further includes the steps of:

increasing the frequency of the heartbeat status message if the first process has a high priority level; and reducing the frequency of the heartbeat status message if the first process has a low priority level.

20. The method of claim 16 wherein the heartbeat status messages can be any application messages.

21. The method of claim 16 wherein the step of controlling further includes a step of controlling the frequency of the heartbeat status message based on the reliability of both the first process and the network.

22. A method for solving multiple consensus based problems concurrently in a distributed computer network, the distributed computer network having one or more distributed consensus client processes proposing one or more consensus based problems, and one or more distributed consensus server processes for solving the consensus based problems concurrently, the method comprising the steps of:

transporting communication messages among distributed processes through an event bus;

using one or more priority failure detectors to detect failed processes based on their predetermined priority levels using heartbeat status messages, wherein each of the heartbeat status messages is associated with a frequency based on an assigned priority level of the heartbeat status message, so that an amount of traffic on the event bus may be minimized by adjusting the frequency of each heartbeat status message; and solving the consensus based problems by providing a distributed consensus service through one or more asynchronous consensus sessions with the assistance of the event bus and the priority failure detectors, wherein the client and server processes are tagged for their respective consensus sessions, and any failure in a single process in the distributed computer network does not affect any other process, thus providing a fault tolerant and reliable mechanism.

23. The method of claim 22 wherein the priority levels are determined based on the importance of the processes in the consensus session.

24. The method of claim 22 wherein the priority levels are determined based on an expected reliability of the processes and the distributed computer network.

25. The method of claim 22 wherein the distributed consensus service is a generic consensus service independent from any particular application protocol.

26. A system for solving consensus based problems in a distributed computer network, the distributed computer network having at least one distributed consensus client process proposing a consensus based problem, and at least one distributed consensus server process for solving the consensus based problem, the system comprising the steps of:

an event bus for transporting communication messages among distributed processes;

at least one priority failure detector for detecting failed processes based on prioritized status messages, wherein the priority failure detector includes:

instructions for assigning all processes in the consensus session with a set of predetermined priority levels;

instructions for adjusting a frequency of a periodic heartbeat status message sent by each prioritized process based on its assigned priority level; and instructions for detecting a failure of the prioritized process based on the frequency controlled heartbeat status message; and a distributed consensus service for achieving a universal consensus result through an asynchronous consensus session with the assistance of the event bus and the at least one priority failure detector, wherein any failure in a single process in the distributed computer network does not affect any other process, thus providing a fault tolerant and reliable mechanism.

27. The system of claim 26 the distributed consensus service further includes a name service for assigning a unique logical identity to each process.

28. The system of claim 27 further includes:
instructions for registering all related distributed consensus server processes with the name service upon initiation of the distributed consensus service; and
instructions for assigning the unique logical identity to each distributed consensus server process only after all the distributed consensus server processes have completed the registration.

29. The system of claim 26 wherein the instructions for adjusting further includes the instructions for assigning a high frequency for a heartbeat status message for a process of a high priority level so that reliability of the distributed computer network is enhanced.

30. The system of claim 26 wherein the instructions for adjusting further includes the instructions for assigning a low frequency for a heartbeat status message for a process of a low priority level so that the overall message communication on the event bus can be minimized.

31. The system of claim 26 wherein the event bus offers different Quality-of-Services for different consensus based protocols based on a needed reliability of the communication.

32. The system of claim 26 wherein the distributed consensus service further includes the instructions for:
initiating a consensus problem from a client process by sending a proposed value to a group of related processes with the assistance of at least one agreement protocol;
filtering the consensus problem in order to customize the consensus service in a run time fashion;
solving the consensus problem by all consensus server processes;
passing the consensus result solved to the agreement protocol; and
distributing the consensus result to all related processes of the agreement protocol,
wherein the consensus server processes are detached from any client process through the step of filtering.

33. The system of claim 32 wherein a predetermined set of client processes communicate only with a designated consensus server process.

34. The system of claim 32 wherein a predetermined set of client processes communicate with a first designated consensus server process and a second designated consensus server process, wherein the second designated consensus server process is a backup server process for the first designated consensus server process.

35. The system of claim 32 wherein the distributed consensus service further includes a consensus coordinator that manages all related processes for solving the consensus problems.

36. The system of claim 32 wherein the consensus coordinator manages multiple consensus problems concurrently.

37. A system for locking two or more distributed objects using consensus based protocols in a distributed computer network, the system comprising the instructions for:
broadcasting a request to at least one resource object for a lock on at least one proposed object by an initiating distributed object using a consensus based protocol; and
deciding on the proposed object through a consensus service session for the resource objects to grant the lock to the at least one proposed object in a predetermined order,
wherein any failure in a single resource object in the distributed computer network does not affect the other objects, thus providing a fault tolerant and reliable mechanism.

38. The system of claim 37 wherein the instructions for deciding further includes appropriate filtering mechanisms for customizing the consensus service for different agreement protocol in a runtime fashion.

39. The system of claim 37 wherein all messages necessary for the consensus service are transported on an event bus.

40. The system of claim 37 further comprising at least one distributed priority failure detector for detecting any related process failure, the related process being prioritized based on the importance of the process to the consensus session.

41. A system for detecting process failures in a distributed computer network, the system comprising:
a heartbeat status message sent periodically from a first process to a second process;
instructions for assigning a priority level to the first process in the distributed computer network;
instructions for controlling the frequency of the heartbeat status message of the first process according to its priority level; and
instructions for detecting any process failure of the first process by the second process based on the reception of the heartbeat status message.

42. The system of claim 41 wherein the priority status can be set or changed dynamically.

43. The system of claim 41 further includes instructions for adjusting a timeout value in the second process for receiving the heartbeat message.

44. The system of claim 41 wherein the instructions for controlling further includes the instructions for:
increasing the frequency of the heartbeat status message if the first process has a high priority level; and
reducing the frequency of the heartbeat status message if the first process has a low priority level.

45. The system of claim 41 wherein the heartbeat status messages can be any application messages.

46. The system of claim 41 wherein the instructions for controlling further includes the instructions for controlling the frequency of the heartbeat status message based on the reliability of both the first process and the network.

47. A system for solving multiple consensus based problems concurrently in a distributed computer network, the distributed computer network having one or more distributed consensus client processes proposing one or more consensus based problems, and one or more distributed consensus server processes for solving the consensus based problems concurrently, the system comprising:
an event bus for transporting communication messages among distributed processes;
one or more priority failure detectors to detect failed processes based on their predetermined priority levels using heartbeat status messages, wherein each of the heartbeat status messages is associated with a frequency based on an assigned priority level of the heartbeat status message, so that an amount of traffic on the event bus may be minimized by adjusting the frequency of each heartbeat status message; and
a distributed consensus service for solving the consensus based problems through one or more asynchronous consensus sessions with the assistance of the event bus and the priority failure detectors,
wherein the client and server processes are tagged for their respective consensus sessions, and any failure in a single process in the distributed computer network does not affect any other process, thus providing a fault tolerant and reliable mechanism.

48. The system of claim 47 wherein the priority level of a process is determined based on the importance of the process in the consensus session.

49. The system of claim 47 wherein the priority level of a process is determined based on an expected reliability of the process and the distributed computer network.

50. The system of claim 47 wherein the distributed consensus service is a generic consensus service independent from any particular application protocol.

51. The method of claim 1 wherein using the priority failure detector further comprises:

placing the prioritized process for which the failure was detected on a suspect list;

removing the prioritized process from the suspect list after a predetermined period of time elapses during which no additional failures of the prioritized process were detected; and extending a timeout period associated with the prioritized process if no additional failures of the prioritized process were detected, wherein the timeout period is used in detecting a failure of the prioritized process.

* * * * *